(No Model.) 3 Sheets—Sheet 1.

C. WRIGHT.
POTATO OR SEED PLANTER.

No. 406,811. Patented July 9, 1889.

Fig-1-

Witnesses:
E. P. Ellis,
Allen A. Pattison

Inventor:
Chester Wright,
per J. A. Lehmann,
Atty.

(No Model.) 3 Sheets—Sheet 2.
C. WRIGHT.
POTATO OR SEED PLANTER.
No. 406,811. Patented July 9, 1889.
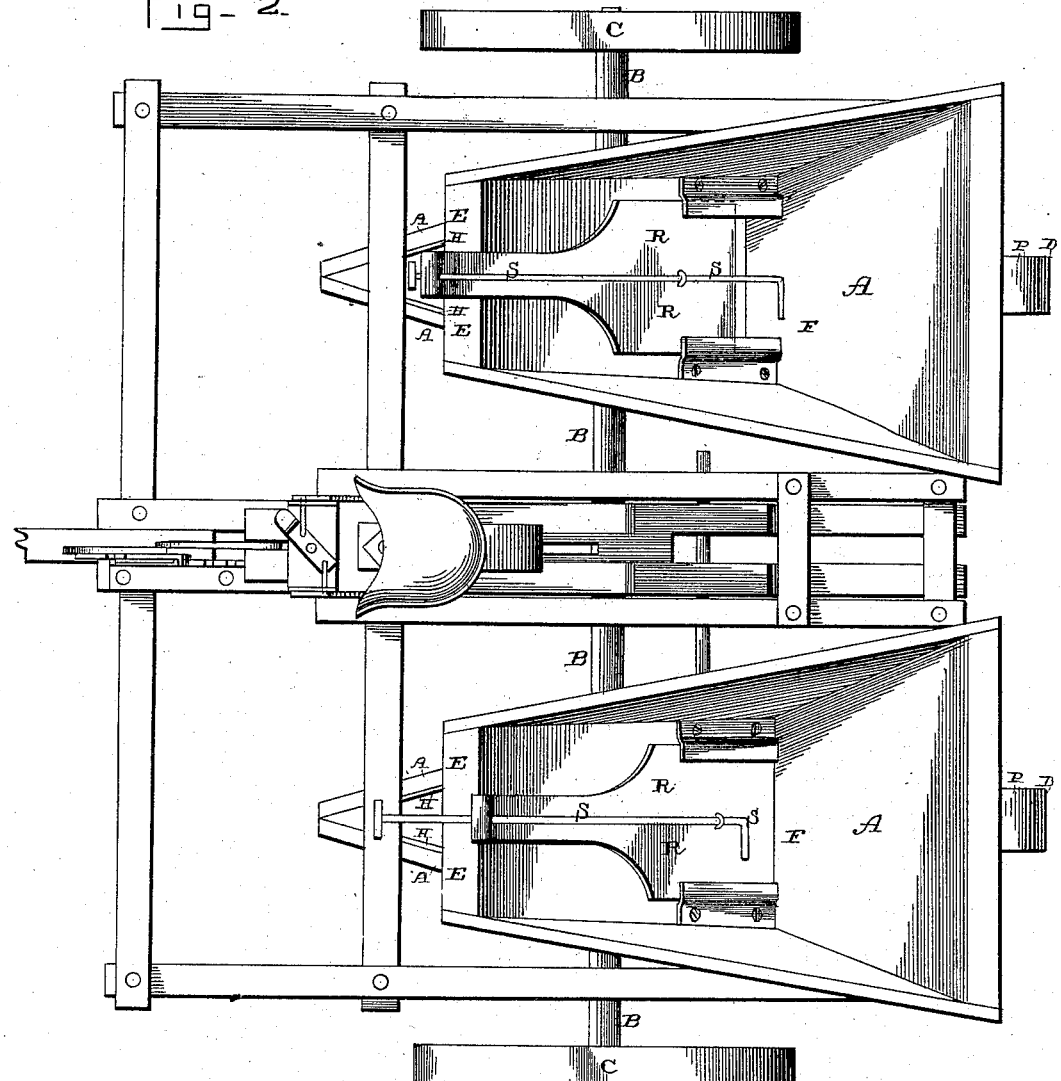
Fig. 2.
Fig. 3.
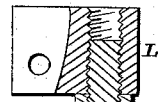
Fig. 4.
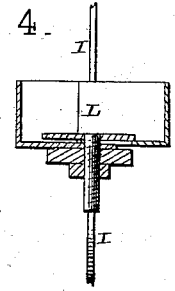
Witnesses:
E. P. Ellis,
Allen S. Pattison
Inventor:
Chester Wright,
per
F. A. Lehmann,
Atty.

(No Model.) 3 Sheets—Sheet 3.
C. WRIGHT.
POTATO OR SEED PLANTER.

No. 406,811. Patented July 9, 1889.

UNITED STATES PATENT OFFICE.

CHESTER WRIGHT, OF FAIRFIELD, NEBRASKA.

POTATO OR SEED PLANTER.

SPECIFICATION forming part of Letters Patent No. 406,811, dated July 9, 1889.

Application filed March 15, 1889. Serial No. 303,434. (No model.)

*To all whom it may concern:*

Be it known that I, CHESTER WRIGHT, of Fairfield, in the county of Clay and State of Nebraska, have invented certain new and useful Improvements in Potato and Seed Planters; and I do hereby declare the following to be a full, clear, and exact description of the invention, such as will enable others skilled in the art to which it pertains to make and use it, reference being had to the accompanying drawings, which form part of this specification.

My invention relates to an improvement in potato and seed planters; and the object of my invention is to provide a machine which will plant two rows of potatoes or seeds at the same time, and in which revolving wheels are used, and to which cups of different shapes and sizes can be attached, according to the kind and size of the seed to be planted.

Figure 1:
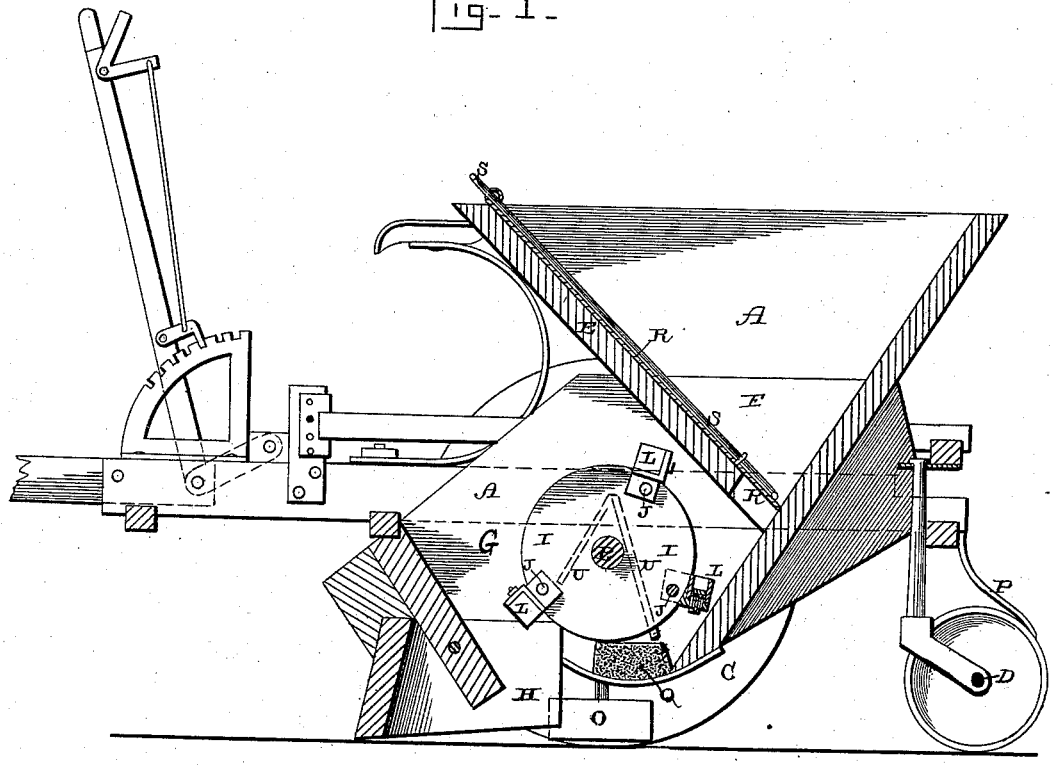
Figure 5:
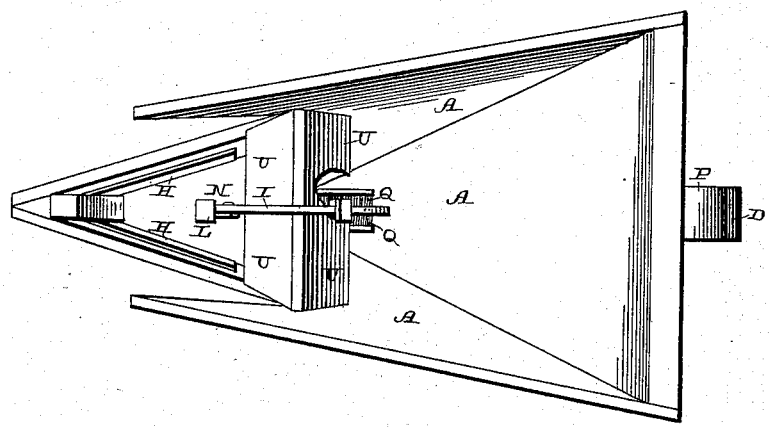

Figure 1 is a longitudinal section of a machine which embodies my invention, taken through one of the seed-boxes. Fig. 2 is a plan view of the same. Figs. 3 and 4 show different forms of seed-cups. Fig. 5 is a plan view of one of the frames with the partition E removed, showing the interior mechanism.

A represents triangular frames, which are supported at their front ends upon the axle B and wheels C, and at their rear ends by the covering-rollers D. The triangular frames are divided at or near their centers by the partitions E, so as to divide the frames into two chambers F G. The potatoes placed in the front chambers G are the ones which are being planted, while those in the chambers F are prevented from passing into the chambers G by the partition E and cut-off R, and thus preventing an unnecessary weight being brought to bear upon the operating parts.

In moving the machine to the field or into position to begin planting the potatoes are all placed in the chambers F, and then allowed to pass down into the chambers G, under the lower edge of the partition, just as they are needed. Slides R are used to control the openings through the partitions E, so as to regulate the passage of seed from the upper to the lower chambers, and attached to these slides are the endwise-moving bent rods S, which may act as stirrers to the potatoes in case they should become clogged. The rods are to be moved back and forth endwise and turned through half a circle until the clogged potatoes or seed become loosened. The axle B extends horizontally through the chambers G, the front portion of which is formed by suitable metallic frames H, which are placed inside of the frame A at its front lower end, and which frames form plows or furrow-openers, and do not extend as high as the top of the frames A, so as to avoid the necessity of making the planting-wheels of larger diameter than is necessary. The driving-wheels revolve on the axle, except when in gear, and then the axle turns, so that as the machine is moved forward the planting-wheels I, which are placed between the frames H, will be made to revolve.

Around the outer edge of the planting-wheels I is made a series of openings, through which the clamping-bolts J are passed for the purpose of securing the seed-cups L to the wheels. These cups L may be made of different shapes, according to the kind of seed to be planted. If small seed are to be planted, the quantity which each cup shall hold is regulated by a vertically-adjustable bottom in the usual manner. The cups will then be placed as near together or as far apart as may be desired. If the potatoes are to be planted, then the cups are made in two parts, and these parts are secured to suitable frames or supports which are clamped to the frame, and the size of the cup is graduated to the size of the potatoes which are to be planted, no matter whether they are whole or cut in pieces. As the cups are moved upward from the bottom of the chambers G by the planting-wheel they are filled with the regulated amount of seed or potatoes, and are then carried on around by the planting-wheels and drop through the openings N in the front of the frames H directly in the furrows which have been opened to receive them. As fast as the seed or potatoes are dropped they are covered by the covering devices O, which are secured to the sides of the frames, and which can be raised or lowered or set at different angles, according to the amount of earth necessary for covering the seed. As fast as the seed are covered earth is compacted upon them by the rollers D, which are provided with scrapers P to prevent the roller from becoming clogged.

Placed in the bottom of the front end of the chambers G are suitable brushes Q, which are made to prevent the seed from falling down into and out of the front end of the chamber. Whatever seed runs down in between these brushes, after the passage of one cup through them, is caught by the succeeding cup. As shown, the front end of the bottom of the chambers G is turned upward to a suitable height. The seed, sliding down toward the front end of the chambers G, is always in position to be caught by the cups attached to the planting-wheels. The bottom front edges of the chamber may be filled in at a suitable angle or level, so that the seed will find no lodgment behind the brushes, but will be forced directly into the line of travel of the cups.

U indicates V-shaped frames or division-plates, (preferably metal,) which are rigidly secured to the sides of the frame A, adjacent to the wheel I, and extend inward near the face of said wheel, as shown in Fig. 1. These frames prevent the seed from passing between the wheel and the inner side of the frame A, as they would otherwise do, and, together with the brushes Q, form the chamber G, into which the seed pass from the hopper F. By this construction it will be seen that the planting-wheel I is within a chamber which is entirely separated from the hopper proper, and yet in such relation to the furrow-opener H as to drop the seed directly between its rear separated ends into the furrow before any of the dirt falls therein.

I do not limit myself to any precise shape, form, or construction of seed-cup, for this may be varied at will without departing from the spirit of my invention. Neither do I limit myself to any particular form of devices for throwing the parts in and out of gear, for any devices which will answer for this purpose may be used.

Having thus described my invention, I claim—

1. In a planter, the combination, with a V-shaped frame having an inclined partition forming a hopper at its upper end and a wheel planting-chamber at its front lower end, of furrow-openers placed in its lower front end, a driving-shaft passing through the lower chamber, having driving and supporting wheels upon its ends, a planting-wheel secured to said shaft within the lower chamber and provided with seed-cups, and stationary brushes within the chamber for brushing away the seed, whereby the planting-wheel is adjacent to the furrow-opener, substantially as shown and described.

2. In a planter, the combination, with a V-shaped frame having an inclined partition forming a hopper at its upper end and a wheel planting-chamber at its front lower end, of the furrow-openers, the driving-shaft passing through the chamber, driving-wheels on its ends, a planting-wheel placed on the shaft within the chamber and having seed-cups, stationary brushes within the chamber below the periphery of the planting-wheel, and division-plates secured to the sides of the chamber extending inward near the face of the planting-wheel, for the purpose specified.

In testimony whereof I affix my signature in presence of two witnesses.

CHESTER WRIGHT.

Witnesses:
W. A. PEARMAN,
F. ANAWALT.